United States Patent
Romano et al.

(10) Patent No.: US 10,481,836 B2
(45) Date of Patent: Nov. 19, 2019

(54) MACHINE LEARNING METHOD AND SYSTEM FOR PREDICTING FILE CONTROLS

(71) Applicant: BANK OF AMERICA CORPORATION, Charlotte, NC (US)

(72) Inventors: Brad E. Romano, Furlong, PA (US); John R. Sampson, Mint Hill, NC (US); Shashi Thanikella, North Brunswick, NJ (US)

(73) Assignee: Bank of America Corporation, Charlotte, NC (US)

( * ) Notice: Subject to any disclaimer, the term of this patent is extended or adjusted under 35 U.S.C. 154(b) by 554 days.

(21) Appl. No.: 15/277,150

(22) Filed: Sep. 27, 2016

(65) Prior Publication Data

US 2018/0089579 A1    Mar. 29, 2018

(51) Int. Cl.
*G06F 3/06*     (2006.01)
*G06F 21/55*    (2013.01)

(52) U.S. Cl.
CPC ............ *G06F 3/067* (2013.01); *G06F 3/0608* (2013.01); *G06F 3/0643* (2013.01); *G06F 21/554* (2013.01)

(58) Field of Classification Search
CPC ...... G06F 3/067; G06F 3/0608; G06F 3/0643; G06F 21/554
See application file for complete search history.

(56) References Cited

U.S. PATENT DOCUMENTS

| | | | |
|---|---|---|---|
| 5,946,673 A | 8/1999 | Francone et al. | |
| 8,429,103 B1 | 4/2013 | Aradhye et al. | |
| 9,009,090 B2 | 4/2015 | Poulin | |
| 9,058,317 B1 | 6/2015 | Gardner et al. | |
| 9,274,714 B2 * | 3/2016 | Kamila | G06F 3/0605 |
| 9,477,661 B1 * | 10/2016 | Chamness | G06F 11/008 |
| 9,628,350 B2 * | 4/2017 | Dippenaar | G06F 16/11 |
| 2005/0044198 A1 * | 2/2005 | Okitsu | G06F 3/0608 709/223 |
| 2005/0223163 A1 * | 10/2005 | Ogasawara | G06F 3/0613 711/112 |

(Continued)

OTHER PUBLICATIONS

MySQL Documentation Section 8.4, "Limits on Table Column Count and Row Size", Mar. 24, 2016, available at https://web.archive.org/web/20160324113748/https://dev.mysgl.com/doc/mysgl-reslimits-excerpt/5.7/en/column-count-limit.html. (Year: 2016).*

(Continued)

*Primary Examiner* — Kamran Afshar
*Assistant Examiner* — Ryan C Vaughn
(74) *Attorney, Agent, or Firm* — Michael A. Springs

(57) ABSTRACT

An adaptive machine learning system for predicting file controls includes a memory, an interface, and a processor. The memory stores a plurality of controls for incoming files and the interface receives a first file and a second file. The first file has a first property and the second file has a second property. The processor determines a type for each of the first property and the second property, wherein the type of each property is related to a first file control. The processor also determines that the first property and the second property each satisfy the first file control. If the value of the first property and the second property are above a first threshold, the processor changes a value of the first control for incoming files.

19 Claims, 4 Drawing Sheets

(56) References Cited

U.S. PATENT DOCUMENTS

| | | | |
|---|---|---|---|
| 2007/0043923 A1* | 2/2007 | Shue | G06F 3/0605 |
| | | | 711/170 |
| 2010/0125697 A1* | 5/2010 | Lee | G06F 3/0608 |
| | | | 711/103 |
| 2010/0287137 A1* | 11/2010 | Lyakhovitskiy | G06F 16/10 |
| | | | 707/609 |
| 2015/0277802 A1* | 10/2015 | Oikarinen | G06F 3/0631 |
| | | | 711/114 |
| 2016/0092465 A1 | 3/2016 | Dornquast et al. | |

OTHER PUBLICATIONS

U.S. Appl. No. 15/277,276, Romano, et al. entitled "System and Method for File Management in Data Structures", filed Sep. 27, 2016.

U.S. Appl. No. 15/277,418, Romano, et al, entitled "System and Method for Inter-Program File Control Communication", filed Sep. 27, 2016.

U.S. Appl. No. 15/277,541, Romano, et al. entitled "System and Method for Data Structure Migration Control", filed Sep. 27, 2016.

\* cited by examiner

MACHINE LEARNING METHOD AND SYSTEM FOR PREDICTING FILE CONTROLS

TECHNICAL FIELD OF THE INVENTION

This invention generally relates to machine learning methods and systems and more specifically to a machine learning method and system for predicting file controls.

BACKGROUND OF THE INVENTION

As computer systems and networks have become more complex, management of these systems and networks using static systems has become increasingly unworkable. These static management systems have proved inadequate in various respects. Accordingly, there is a need for machine learning systems for overcoming the limitations of static machine systems.

SUMMARY OF THE INVENTION

In some embodiments, an adaptive machine learning system for predicting file controls comprises a memory, an interface, and a processor. The memory stores a plurality of controls for incoming files and the interface is operable to receive a first file and a second file. The first file has a first property and the second file has a second property. Further, the processor is operable to determine a type for each of the first property and the second property, wherein the type of each property is related to a first file control. The processor also determines that the first property of the first incoming file satisfies the first file control and determines that the second property of the second set of incoming files satisfies the first control of incoming files. Additionally, the processor determines that the value of the first property and the second property is above a first threshold. The processor then changes, in response to determining that the value of the first property and the second property is above a first threshold, a value of the first control for incoming files.

The present embodiment presents several technical advantages. For example, in the present embodiment, a predictive file control system flags or otherwise rejects files that do not satisfy certain file controls. Further, one embodiment of the present system learns from past data and changes file controls automatically in response to the past data. This keeps the file control system from rejecting files that should have been accepted by the file control. The present system also executes this predictive system for both incoming and outgoing files. The present embodiment also results in improvements to the computer system itself. For instance, the present embodiment improves processor functionality by preempting foreseeable errors freeing up processing resources for other tasks such as processing files. Further, the present embodiment improves memory functionality by predicting future memory requirements based on the predicted file controls and preemptively addressing any foreseeable memory shortages.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE INVENTION

Figure 1:
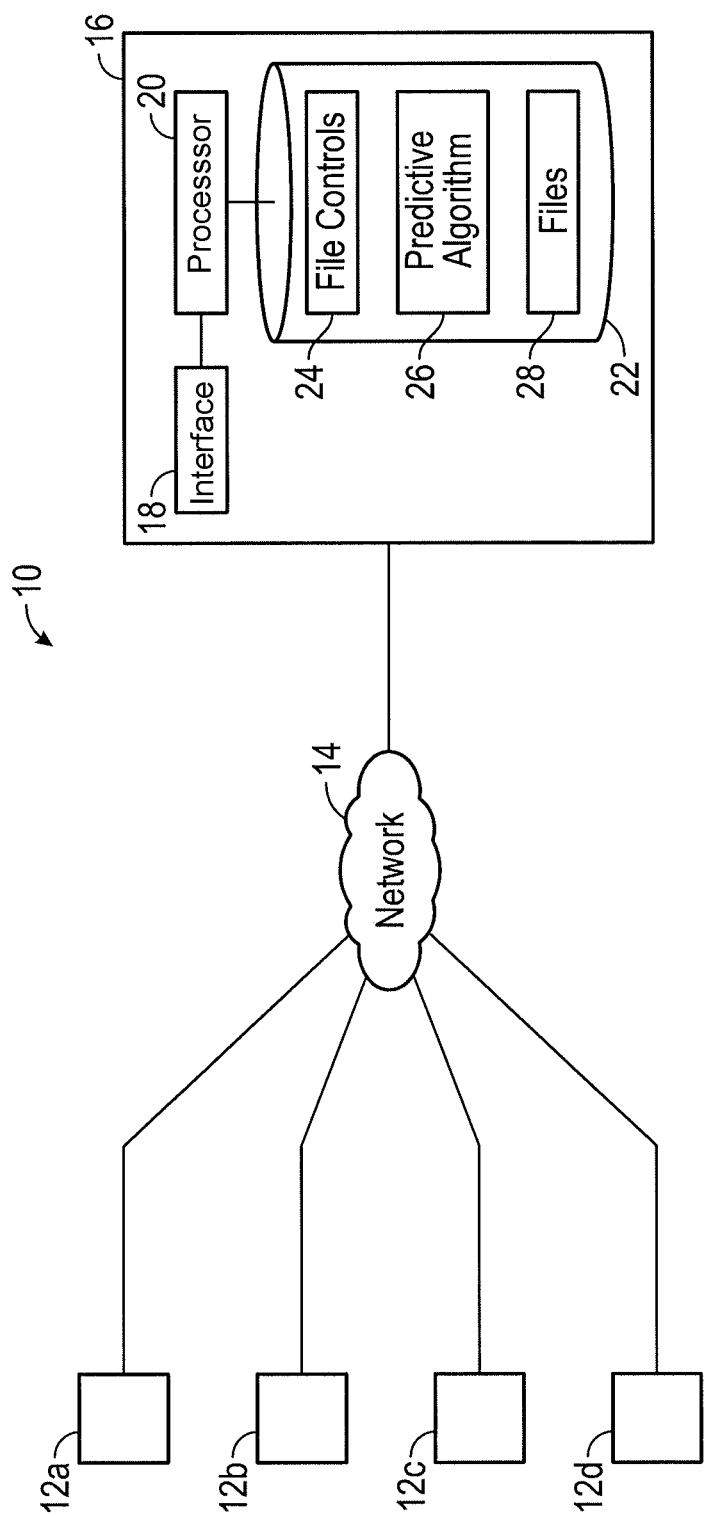
FIG. 1 illustrates an overall system for predictive file controls.

Embodiments of the present disclosure are best understood by referring to FIGS. 1 through 4 of the drawings, like numerals being used for like and corresponding parts of the various drawings.

Computer systems and networks are commonplace in industries and home environments. Increasingly, industries relying on these computer systems and networks are beginning to push up against the technical limitations of these systems. One such limitation is the inability of computer systems used in various industries to learn from past behavior and make changes based on that learning. Without these machine learning concepts encoded into computer systems, these systems are likely to repeat errors and execute flawed commands. The present disclosure addresses one implementation of a machine learning system for implementing and automatically generating file controls for files received by a central repository.

In several industries, a central repository receives and stores files and information generated by an enterprise. For example, in a software development enterprise, various versions of code, metadata associated with the code, business requirements for the program defined by the code, and technical requirements for the code may all be generated by different groups within the enterprise. The enterprise may then require those different groups to communicate that information to a central repository so that each of those groups along with others in the enterprise may be able to access that information. For example, for licensing purposes, the enterprise may require the software developers to include metadata relating to the source and covenants associated with any open-source software that is included in the overall program.

Incorporating such disparate data into a repository presents a technical challenge. The data may come in various formats, including pictures, text, numbers, uncompiled code etc. Further, the data may be incomplete or inaccurate depending upon the source of the data. For example, if a user manually enters the information and uploads it onto the central repository, the user may fail to include relevant metadata such as source information for code. Similarly, a user may upload the wrong file. For example, a user may upload an entire program's code into a section of the repository that is meant to only store updates to the software.

One method for correcting such errors and inaccuracies is an automated system of filtering out inaccurate and erroneous information. One approach for such filtering is to generate static file controls that regulate which files may be stored in the central repository and which files should be rejected. A problem with such an approach, however, is that several file controls change over time as the quality and quantity of information generated by the enterprise changes. As this information changes, the static file controls continue to filter out files that should no longer be filtered. For example, in the central repository of the software development company discussed above, a database within the repository may be designated to accept updates of software and include file controls that regulate the file size of all incoming files. This file control may stipulate, for example, that no file larger than 10 MB may be accepted into the repository. As the updates developed by the enterprise become more complex, file sizes might begin to increase. As such, a legitimate update that is larger than 10 MB may be transmitted to the repository. But, because of the static file control, the update file would be improperly rejected by the repository.

To avoid such improper rejections, the present disclosure discloses a predictive machine learning system that can learn from past behavior and adjust file controls based on past data. Machine learning is a type of artificial intelligence that focuses on the development of computer programs that can teach themselves to grow and change when exposed to new data. So, continuing with the example of updated software above, a machine learning file control system may include a file size restriction of 10 MB. However, the predictive system may include an algorithm that is triggered if the system receives five or more files that are larger than 8 MB and three or more files that are larger than 9 MB. When this happens, the system may recognize that the received files are gradually increasing in size and the file size restriction may be increased from 10 MB to 15 MB. In this manner, the file control may continue to filter out files that are extremely large but may incorporate flexibility so that incoming files are not improperly rejected.

The predictive file control system of the present embodiment improves both filtering technology as well as computer technology. The predictive file control system allows for individualized filtering of files at a centralized location. Further, this centralized filtration scheme can be changed depending on individual files without any user input. This allows for individualized filtering of files in a standardized manner instead of requiring disparate filters at various end points to separately filter each file. Further, the predictive file control system of the present disclosure improves computer technology because it preempts errors in the control system by reducing the number of false positives identified by the file control system. This conserves system resources as the system does not need to continually monitor and accept files that were improperly rejected.

Figure 2:
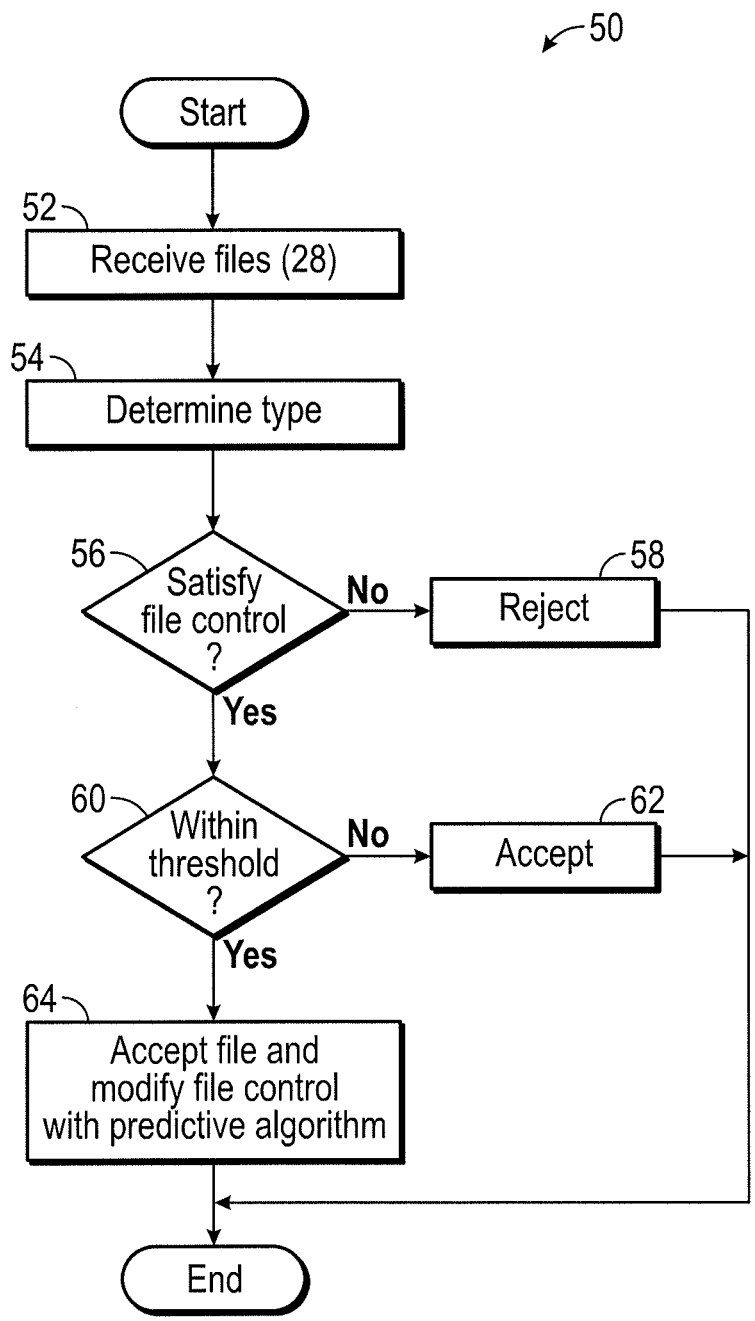
FIG. 2 illustrates a process for predictive file controls for an inbound file.
Figure 3:
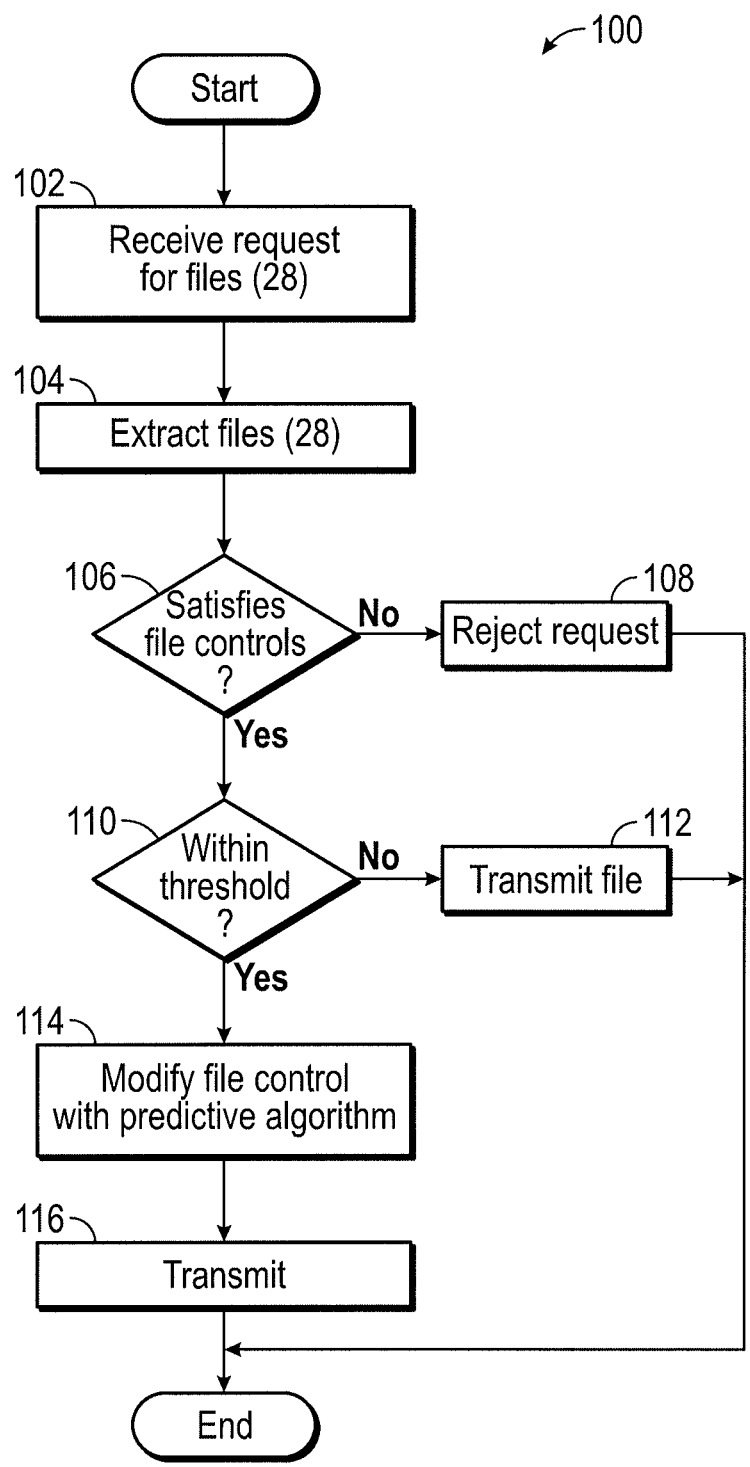
FIG. 3 illustrates a process for predictive file controls for an outbound file.
Figure 4:
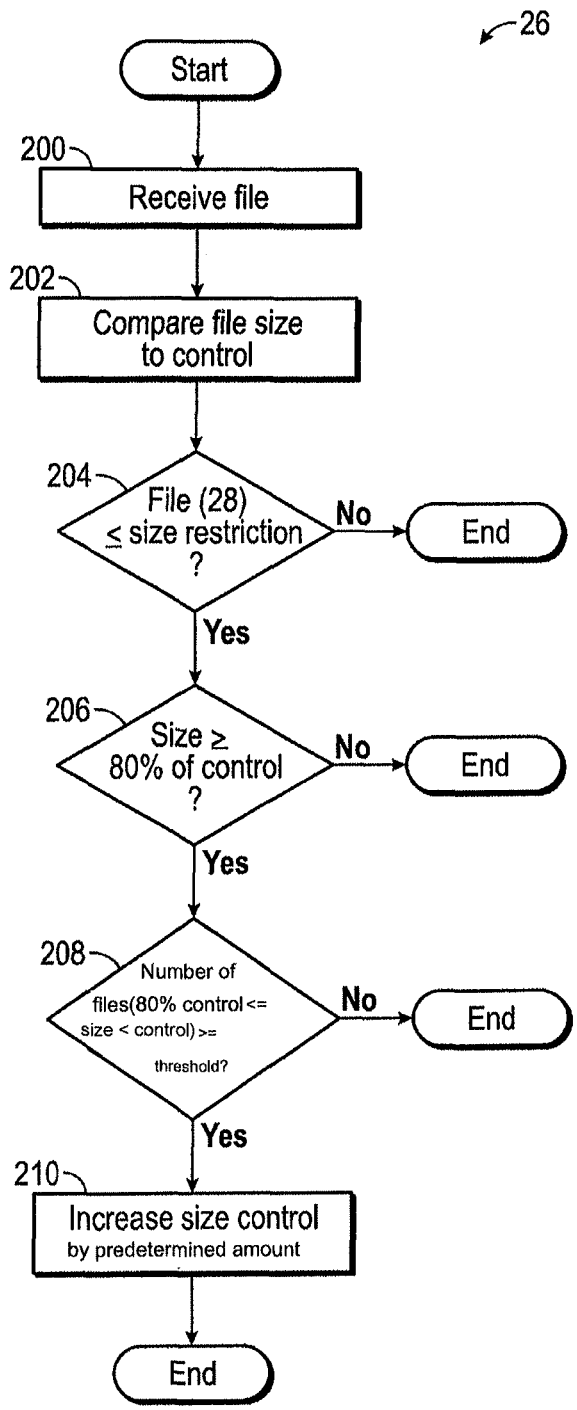
FIG. 4 illustrates an example predictive algorithm.

The present disclosure will be described in more detail using FIGS. 1 through 4. FIG. 1 illustrates an overall system for predictive file controls. FIG. 2 illustrates a method for predictive file controls for an inbound file. FIG. 3 illustrates a method for predictive file controls for an outbound file. And FIG. 4 illustrates an example predictive algorithm. Although the figures illustrate a specific algorithm for inbound and outbound file controls, other embodiments may comprise other similar algorithms without departing from the spirit of the invention.

FIG. 1 illustrates a system 10 comprising data sources 12a, 12b, 12c, and 12d. The data sources are coupled to a network 14 and a machine learning prediction engine 16. Engine 16 further comprises an interface 18, a processor 20, and a memory 22. Memory 22 stores file controls 24, predictive algorithms 26, and received files 28.

Data sources 12a, 12b, 12c, and 12d are engines, databases, or processes that generate or provision data to prediction engine 16. Data sources 12a, 12b, 12c, and 12d may be sources of data internal to an enterprise, external third party sources or a combination of the two. For example, data source 12a may provision data from a department within a company whereas data source 12b may provision data collected over the Internet. Data sources 12a, 12b, 12c, and 12d may provision any suitable type of data. For example, data sources 12a, 12b, 12c, and 12d may provision text data, code, data regarding time or date, numbers or any other suitable type of data. Data sources 12a, 12b, 12c, and 12d may further provision metadata associated with the primary data. For example, data sources 12a, 12b, 12c, and 12d may include information about the size of the primary data being provisioned along with the time and date that the primary data were last updated. Data sources 12a, 12b, 12c, and 12d may further format the provisioned data in any appropriate manner. For example, data sources 12a, 12b, 12c, and 12d may provide date data in mm/dd/yyyy format or mmddyy format.

Network 14 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. Network 14 may additionally include any combination of gateways, routers, hubs, switches, access points, base stations, wireless telephone systems and any other hardware, software or a combination thereof. Network 14 may include any interconnecting system capable of transmitting audio, video, signals, data, messages, or any combination of the preceding between data sources 12a, 12b, 12c, and 12d and prediction engine 16.

In the illustrated embodiment, prediction engine 16 is any module that comprises an interface 18, a processor 20 and a memory 22. Engine 16 may communicate with other aspects of system 10 via network 14. Engine 16 is operable to receive data provisioned by data sources 12a, 12b, 12c, and 12d, process that data, and predict file controls based on the received data.

Interface 18 represents any port or connection, real or virtual, including any suitable hardware and/or software, including protocol conversion and data processing capabilities, to communicate through a LAN, WAN, or other communication system that allows engine 16 to exchange information with the other components of system 10. Interface 18 may communicate with processor 20 and memory 22.

Processor 20 may be any electronic circuitry, including, but not limited to microprocessors, application specific integrated circuits (ASIC), application specific instruction set processors (ASIP), and/or state machines, that communicatively couples interface 18 and memory 22 and controls the operation of engine 16. In some embodiments, processor 20 may be single core or multi-core having a single chip containing two or more processing devices. Processor 20 may be 8-bit, 16-bit, 32-bit, 64-bit or of any other suitable architecture. Processor 20 may comprise an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 20 may include other hardware and software that operate to control and process information. Processor 20 may execute computer-executable program instructions stored in memory 22. Processor 20 is not limited to a single processing device and may encompass multiple processing devices.

Memory 22 may include any one or a combination of volatile or non-volatile local or remote devices suitable for storing information. For example, memory 22 may include RAM, ROM, flash memory, magnetic storage devices, optical storage devices, network storage devices, cloud storage devices, solid state devices, or any other suitable information storage device or a combination of these devices. Memory 22 stores, either permanently or temporarily, data, operational software, other information for processor 20, other components of engine 16, or other components of system 10. For example, memory 22 may store user preferences or default settings for operating engine 16. Memory 22 may store information in one or more databases, file systems, tree structures, relational databases, any other suitable storage system, or any combination thereof. Furthermore, different information stored in memory 22 may use any of these storage systems. The information stored in memory 22 may be encrypted or unencrypted, compressed or uncompressed, and static or editable. Memory 22 may store information in one or more caches.

In one embodiment, memory 22 may store file controls 24, prediction algorithm 26, and received files 28.

File controls 24 are any controls or parameters for managing files. For example, file controls 24 may include controls such as a size control, a record count or volume control, a duplicate data control, a null value control, a date value control, a range control, a time control, etc. A size control, for example, may regulate the size of files that may be stored in memory 22. A record count or volume control may regulate the number of entries a file may have. A duplicate data control may regulate the number of allowed duplicative entries in a file. A null value control may regulate the number of null values in a file. A date value control may regulate the date on which the incoming file was last updated. A range control may regulate the range of data that may be included in a file. A time control may regulate the time the file was last updated or a time window within which the file was received by the prediction engine 16.

Prediction algorithm 26 is an algorithm that prediction engine 16 may use to learn from past data and predict future file controls. For example, prediction algorithm 26 may learn from the size of the last five received files that the stored file control 24 related to the size of incoming or outgoing files is overly restrictive and needs to be changed. One example of a prediction algorithm is shown in FIG. 4 and explained in greater detail below. Other similar prediction algorithms 26 may relate to increasing or decreasing other file controls relating to the range, time, date etc. of incoming or outgoing files. Prediction engine 16 may apply prediction algorithms 26 to incoming or outgoing files as shown in FIGS. 2 and 3 and explained in greater detail below. For example, in one embodiment, prediction engine 16 may apply a prediction algorithm 26 for files that are provisioned by data sources 12. In other embodiments, prediction engine 16 may apply prediction algorithm 26 to files that are requested by other systems or data sources 12 before the files are communicated to those systems or sources.

Received files 28 comprise files and data that prediction engine 16 receives from data sources 12. These files may include primary content and secondary content. The primary content of files 28 may be of any suitable type including text, video, numbers, presentation, audio, etc. The secondary content of files 28 may comprise metadata about the file and about the primary data. As such, secondary content may comprise such information as the size of the primary content, the source of the primary content, the time the primary content was last updated or uploaded, the date the primary content was last updated or uploaded, and other similar information about the primary content.

In operation, interface 18 of prediction engine 16 receives files 28 from data sources 12*a*, 12*b*, 12*c*, and 12*d* via network 14. As illustrated in FIG. 2 and explained in greater detail below, processor 20 then applies file controls 24 and prediction algorithm 26 to the received files 28 before storing the received files 28 in memory 22. Further, as illustrated in FIG. 3 and discussed in greater detail below, when data sources 12*b*, 12*b*, 12*c*, or 12*b* or any other process or system requests files 28 from prediction engine 16, prediction engine 16 extracts files 28 from memory 22, applies file controls 24 and prediction algorithm 26 to the requested files 28, and transmits the files 28. Processor 20 may apply any prediction algorithm 26 that is operable to predict changes in file controls 24. In this manner, executing prediction algorithm 26 results in the unexpected result of the received file 28 being stored in memory 22 even though received file 28 would, under normal operation, have been rejected by prediction engine 16. This feature of system 10 overcomes challenges inherent in computer technology. For example, in a system 10 that does not utilize prediction engine 16 and predictive algorithm 26, received files 28 that should be accepted would be erroneously rejected. Computers in that system 10 would need to trace those erroneously rejected files 28 and manually accept them. However, by using prediction algorithm 26, prediction engine 16 accepts received files 28 that would otherwise trigger false errors. By eliminating such errors, system 10 conserves computer resources such as processing power and bandwidth that would otherwise be needed to resolve such errors. One example of such a prediction algorithm 26 is shown in FIG. 4 and discussed in greater detail below.

FIG. 2 illustrates a process 50 for predictive file controls 24 for an inbound file 28. At step 52, prediction engine 16 receives files 28 from data sources 12. Then, at step 54, prediction engine 16 determines a type for the received file 28. Based on the type of file 28, at step 56, engine 16 determines if the received file 28 satisfies the file controls 24 for the received file type. For example, if the file comprises numeric data, prediction engine 16 may determine if the numeric data is within a predefined range. If received file 28 does not satisfy the one or more relevant file controls 28, prediction engine 16 rejects the file 28 at step 58. Prediction engine 16 may reject file 28 in any appropriate manner including by alerting a user that file 28 does not satisfy one or more file controls 24, by pausing the transmission of file 28, by notifying a user that the user has a certain window of time to satisfy the relevant file control, by terminating the transmission of file 28, and/or by implementing any other suitable process. If received file 28 does satisfy the one or more relevant file controls 28, then at step 60, prediction engine 16 determines if the relevant file control 24 of received file 28 satisfies one or more thresholds (e.g., is within the boundaries of a lower threshold and/or upper threshold) for triggering prediction algorithm 26.

The file controls 28 may trigger prediction algorithm 26 in several different ways. For example, prediction algorithm 26 may be triggered if received file 28 has a property that approximates a restriction implemented by file control 24. So, in the example where file control 24 filters out all files that are larger than ten (10) MB, prediction algorithm 26 may be triggered if prediction engine 16 receives five (5) or more files that are larger than eight (8) MB. Similarly, if file control 24 only accepts files that have data ranging from one (1) to ten (10), prediction algorithm 26 may be triggered if prediction engine 16 receives ten (10) or more files that comprise data ranging from eight (8) to ten (10).

If, at step 60, prediction engine 16 determines that the relevant file control 24 of received file 28 does not satisfy a threshold for triggering prediction algorithm 26, then, at step 62, prediction engine 16 accepts file 28 and stores it in memory 22, but does not execute prediction algorithm 26. If, at step 60, prediction engine 16 determines that the relevant file controls 24 of received file 28 do satisfy the one or more thresholds for triggering prediction algorithm 26, process 50 moves to step 64.

At step 64, prediction engine 16 accepts received file 28 and executes prediction algorithm 26 to update the relevant file control 24. Prediction algorithm 26 may be any suitable algorithm that reviews primary and secondary data from previously received files 28, predicts changes for file controls 24, and implements those changes in file controls 24. For example, if file controls 24 place a size restriction of ten (10) MB on all received files 28 and prediction engine 16 receives five (5) or more files that are larger than eight (8) MB, prediction engine 16 may change file control 24 to a fifteen (15) MB file size restriction. In this manner, prediction engine 16 learns from past received data and changes files controls 24 based on that learned information. After changing the relevant file control 24, process 50 may end.

FIG. 3 illustrates a process 100 for predictive file controls 24 for an outbound file 28. Process 100 is similar to process 50 except that process 50 illustrates predictive file controls 24 for a file 28 that is received by prediction engine 16 whereas process 100 illustrates predictive file controls 24 for a file 28 that is transmitted by prediction engine 16. In process 100, at step 102, data source 12 or any other system or process requests a file 28 that is stored in memory 22. At step 104, prediction engine 16 extracts that file 28 from memory 22 and, at step 106, determines if extracted file 28 satisfies one or more relevant file controls 24 as discussed above in relation to FIG. 2. If extracted file 28 does not satisfy one or more file controls 24, then at step 108, prediction engine 16 rejects the request for file 28 in any suitable manner including by informing the requesting source that the file 28 does not satisfy a particular file control 24, by terminating the request, by communicating the file 28 and flagging the failed file control 24 or in any other suitable manner.

If at step 106, prediction engine 16 determines that file 28 satisfies the relevant file controls 24, then at step 110, prediction engine 16 determines if the relevant file control 24 of received file 28 satisfies one or more thresholds (e.g., is within the boundaries of a lower threshold and/or upper threshold) for triggering prediction algorithm 26. If, at step 110, prediction engine 16 determines that the relevant file control 24 of received file 28 does not satisfy a threshold for triggering prediction algorithm 26, at step 112, prediction engine 16 transmits the requested file 28 to the requesting source, but does not execute predictive algorithm 26.

If at step 110, prediction engine 16 determines that file 28 satisfies the one or more thresholds for triggering prediction algorithm 26, then at step 114 prediction engine 16 executes a prediction algorithm 26 to predict and change the relevant file controls 24 as discussed above in relation to FIG. 2. Prediction engine 16 then transmits the requested file 28 to the requesting source at step 116.

FIG. 4 illustrates an example prediction algorithm 26 according to one embodiment of the present invention. Although FIG. 4 illustrates one particular prediction algorithm 26, prediction engine 16 may implement other similar prediction algorithms 26 for different file controls 24.

The illustrated prediction algorithm 26 relates to a file control 24 for restricting the size of files 28 that may be received by prediction engine 16. In the illustrated algorithm 26, prediction engine 16 receives a file 28 at step 200. Then, at step 202, received file 28 is subject to a file control 24 that compares the file size of the received file 28 to a predetermined allowable file size. At step 204, if the size of received file 28 is greater than the predetermined allowable file size, prediction algorithm 26 ends. If, however, the size of received file 28 is less than or equal to the predetermined allowable file size, then at step 206, prediction algorithm 26 determines if the size of received file 28 is greater than 80% of the allowable file size. If the size of received file 28 is not greater than 80% of the allowable file size, prediction algorithm 26 ends. If, however, the file size of received file 28 is greater than 80% of the allowable file size, then at step 208, prediction algorithm 26 determines if the number of files 28 received by prediction engine 16 that are of a size greater than 80% of the allowable file size but less than the allowable file size exceeds a predetermined threshold. For example, at step 208, prediction algorithm 26 may determine if prediction engine 16 has received five or more files 28 that are all of a size greater than 80% of the allowable file size but less than the allowable file size. If, at step 208, the number of qualifying files 28 received is fewer than the predetermined threshold, prediction algorithm 26 ends. If the number of qualifying files 28 received is greater than or equal to the predetermined threshold, then at step 210, prediction algorithm 26 increases the file size restriction of the relevant file control 24 by a predetermined amount. For example, prediction algorithm 26 may increase the file size restriction by 50%, 100%, or any other suitable value. Once prediction algorithm 26 has increased the size of the file restriction, algorithm 26 ends.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. An adaptive machine learning system for predicting file controls comprising:
   a memory operable to store a plurality of controls for incoming files;
   an interface operable to receive a first file and a second file; and
   a processor operable to:
   determine a first file size of the first file;
   determine that the first file size exceeds a file size restriction of the plurality of controls;
   in response to determining that the first file size exceeds the file size restriction, reject the first file;
   determine a second file size of the second file;
   determine that the second file size does not exceed the file size restriction;
   in response to determining that the second file size does not exceed the file size restriction, store the second file in the memory;
   determine that the second file size is within a threshold percentage of the file size restriction;

determine that a number of previously received files are also within the threshold percentage of the file size restriction;
in response to determining that the second file size is within the threshold percentage of the file size restriction, increment the number;
determine that the incremented number exceeds a threshold of received files within the threshold percentage of the file size restriction;
in response to determining that the incremented number exceeds a threshold of received files within the threshold percentage of the file size restriction, increase the file size restriction;
receive the first file subsequent to increasing the file size restriction;
determine that the file size of the subsequently received first file does not need exceed the increased file size restriction; and
in response to determining that the file size of the subsequently received first file does not exceed the increased file size restriction, store the first file in the memory.

2. The system of claim 1, wherein rejecting the first file comprises terminating a transmission of the first file.

3. The system of claim 1, wherein the threshold percentage is 80%.

4. The system of claim 1, wherein the second file is stored in one or more caches.

5. The system of claim 1, wherein the processor is further operable to terminate transmission of a requested, outbound third file if a file size of the third file exceeds the increased file size restriction.

6. The system of claim 1, wherein the plurality of controls comprise a data volume restriction for incoming files.

7. The system of claim 6, wherein the processor is further operable to increase the data volume restriction in response to receiving a third file that includes a number of entries that is within a threshold value of the data volume restriction.

8. A method for adaptive machine learning for predicting file controls comprising:
electronically receiving a first file and a second file;
determining a first file size of the first file;
determining that the first file size exceeds a file size restriction;
in response to determining that the first file size exceeds the file size restriction, rejecting the first file;
determining a second file size of the second file;
determining that the second file size does not exceed the file size restriction;
in response to determining that the second file size does not exceed the file size restriction, storing the second file in the memory;
determining that the second file size is within a threshold percentage of the file size restriction;
determining that a number of previously received files are also within the threshold percentage of the file size restriction;
in response to determining that the second file size is within the threshold percentage of the file size restriction, incrementing the number;
determining that the incremented number exceeds a threshold of received files within the threshold percentage of the file size restriction;
in response to determining that the incremented number exceeds a threshold of received files within the threshold percentage of the file size restriction, increasing the file size restriction;
receiving the first file subsequent to increasing the file size restriction;
determining that the file size of the subsequently received first file does not need exceed the increased file size restriction; and
in response to determining that the file size of the subsequently received first file does not exceed the increased file size restriction, storing the first file in the memory.

9. The method of claim 8, wherein rejecting the first file comprises terminating a transmission of the first file.

10. The method of claim 8, wherein the threshold percentage is 80%.

11. The method of claim 8, further comprising terminating transmission of a requested, outbound third file if a file size of the third file exceeds the increased file size.

12. The method of claim 8, wherein the second file is stored in one or more caches.

13. The method of claim 8, further comprising increasing a data volume restriction in response to receiving a third file that includes a number of entries that is within a threshold value of the data volume restriction.

14. An adaptive machine learning system for predicting file controls comprising:
a memory operable to store a plurality of size restrictions for incoming files, wherein at least one size restriction relates to an amount of memory space occupied by a corresponding incoming file;
an interface operable to receive a first file and a second file; and
a processor operable to:
determine a first file size of the first file;
determine that the first file size exceeds a file size restriction of the plurality of controls;
in response to determining that the first file size exceeds the file size restriction, reject the first file;
determine a second file size of the second file;
determine that the second file size does not exceed the file size restriction;
in response to determining that the second file size does not exceed the file size restriction, store the second file in the memory;
determine that the second file size is within a threshold percentage of the file size restriction;
determine that a number of previously received files are also within the threshold percentage of the file size restriction;
in response to determining that the second file size is within the threshold percentage of the file size restriction, increment the number;
determine that the incremented number exceeds a threshold of received files within the threshold percentage of the file size restriction;
in response to determining that the incremented number exceeds a threshold of received files within the threshold percentage of the file size restriction, increase the file size restriction;
receive the first file subsequent to increasing the file size restriction; and
in response to determining that the file size of the subsequently received first file does not exceed the increased file size restriction, store the first file in the memory.

15. The system of claim 14, wherein rejecting the first file comprises terminating a transmission of the first file.

16. The system of claim 14, wherein the threshold percentage is 80%.

17. The system of claim 14, wherein increasing the file size restriction is further done in response to a determination that one or more previously received files had file sizes that were within the threshold percentage of the file size restriction.

18. The system of claim 14, wherein the processor is further operable to terminate transmission of a requested, outbound third file if a file size of the third file exceeds the increased file size restriction.

19. The system of claim 14, wherein the processor is further operable to increase a data volume restriction in response to receiving a third file that includes a number of entries that is within a threshold value of the data volume restriction.

\* \* \* \* \*